United States Patent Office 3,450,647
Patented June 17, 1969

3,450,647
CATALYTIC PROCESS FOR THE POLYMERIZATION OF VICINAL ALKYLENE OXIDES
Peter Gunther, Opladen, and Heinz Herlinger, Leverkusen-Steinbuechel, Germany, assignors to Farbenfabriken Bayer Aktiengesellschaft, Leverkusen, Germany, a corporation of Germany
No Drawing. Filed Jan. 5, 1968, Ser. No. 695,873
Claims priority, application Germany, Jan. 7, 1967,
F 51,199
Int. Cl. C08g 23/06
U.S. Cl. 260—2
9 Claims

ABSTRACT OF THE DISCLOSURE

Vicinal alkylene oxides are polymerized in the presence of a catalyst which is obtained by reacting a complex of a transition metal salt of an organic or inorganic acid and a hexaalkyl or hexaalkenyl phosphoric acid triamide with a metal alkyl of a metal of the second or third group of the Periodic System in which the alkyl group contains one to four carbon atoms.

---

This invention relates to a catalytic process for the polymerization of alkylene oxides and more particularly to the preparation of polymers of alkylene oxides in the presence of an improved catalyst.

It is already known that olefine oxides may be polymerized in the presence of a catalyst obtained by adding aluminum trialkyls to the reaction product of a titanic acid ester and titanium tetrachloride the composition of which is unknown.

It is also known that olefine oxides may be copolymerized with butadiene, using a catalyst consisting of a zinc dialkyl and a bisphosphine adduct of a nickel or cadmium halide. This catalyst, however, gives very low yields when used in the homopolymerization of epoxides.

Catalysts obtained from organic chelate compounds of nickel, titanium, vanadium, chromium, iron, cobalt and molybdenum and metal alkyls have also been used for epoxide polymerization.

The first mentinoed process has the disadvantage that the catalytic activity of the titanium compound used is very limited and is usually unsatisfactory after about 14 days and the second process only provides very low yields when used for homopolymerization. Furthermore, the third process requires complicated and expensive preparation of the organic metal chelate compounds, which must be free from halogen.

It is therefore an object of this invention to provide a process for the polymerization of alkylene oxides which avoids these disadvantages. Another object of the invention is to provide an improved catalyst for the polymerization of alkylene oxide. Still a further object of this invention is to provide an improved process for the preparation of isotactic or syndiotactic polymers of propylene oxide and similar branch chain alkylene oxides. Another object of this invention is to provide a process for the polymerization of alkylene oxides in good yield and in a reasonable period of time.

The foregoing objects and others which will become apparent from the following description are accomplished in accordance with the invention, generally speaking, by providing a process for the preparation of alkylene oxides in the presence of a catalyst which has been obtained by reacting a complex or addition product of a transition metal salt and a hexaalkyl or hexaalkenyl phosphoric acid triamide with a metal alkyl of a metal of the second or third group of the Periodic System of elements, said latter alkyl group having one to four carbon atoms. The invention therefore provides for the polymerization of alkylene oxides in a surprisingly easy manner and in high yields because the reaction is carried out in the presence of the above defined catalyst. The alkylene oxides may be used either pure or in admixture with one another. The reaction may also be carried out in the presence of organic solvents.

Any suitable alkylene oxide (which includes olefine oxides) may be used but alkylene oxides containing two to eight carbon atoms are particularly preferred. In addition one may use cycloalkylene oxides containing 5 to 12 carbon atoms, styrene oxides, arylhydroxy propylene oxides, glycidic ethers or the like, such as ethylene oxide, 1,2-propylene oxide, 1,2-butylene oxide, 2,3-butylene oxide, isobutylene oxide, styrene oxide, epichlorohydrin, epibromohydrin, butadiene monooxide, vinyl glycidic ether, allyl glycidic ether, cyclopentane oxide, cyclohexane oxide, dicyclohexyl monooxide, vinyl cyclohexene oxide, phenoxypropylene oxide, the diepoxide of 4,4'-dipropeneoxy diphenyldimethylmethane and the like. It is pointed out that these epoxy compounds can be polymerized alone or in admixture with each other.

Any suitable salt of a transition metal may be used in the prepaartion of the initial complex with the hexaalkyl or hexaalkenyl phosphoric acid triamide. Salts of the transition metals with both organic and inorganic acids are contemplated, such as, for example, the halides, nitrates, sulphates and organic salts such as benzoates, acetates, stearates and the like of the transition metals including titanium, zirconium, hafnium, niobium, cobalt, nickel, iron, chromium, manganese, cadmium, zinc and the like. Specific examples include: titanium (III) chloride, cobaltic chloride, nickel bromide, chromium (III) chloride, manganese (II) chloride, titanium tetrachloride, vanadium tetrachloride, zinc chloride, titanium nitrate, titanium sulphate, titanium benzoate, cobaltous acetate, cobaltic sulphate, cobaltous sulphate, cobaltous benzoate, cobaltous chloride, cobaltous nitrate, cobaltous sulfate, nickelous acetate, nickelous benzoate, nickelous bromide, nickelous chloride, nickelous sulphate, chromic chloride, chromous chloride, chromous acetate, chromous oxalate, manganic chloride, manganic sulphate, manganous acetate, manganous benzoate, manganous nitrate, cadmium acetate, cadmium bromide, cadmium chloride, cadmium nitrate, cadmium sulphate, camdium tartrate, zirconium bromide, zirconium chloride, zirconium oxy chloride, zirconium nitrate, zirconium sulphate, hafnium sulphate, and niobium sulphate. Preferred compounds are titanium (III) chloride, cobalt chloride and nickel bromide.

Any suitable hexaalkyl or hexaalkenyl phosphoric acid triamide may be used. The alkyl or alkenyl radicals may be linear, branched or cyclic, e.g. methyl, ethyl, propyl, propenyl, allyl, butyl, amyl, hexyl, octyl, decyl, dodecyl, stearyl, cyclohexyl and the like. The amino component from which the amide groups of the hexaalkyl or alkenyl phosphoric acid triamide is derived may also be morpholine. However, the alkyl or alkenyl radicals in the hexaalkyl or alkenyl phosphoric acid triamide are preferably n- and iso-alkyl radicals containing one to four carbon atoms such as methyl, ethyl, n-propyl, isopropyl, n-butyl and isobutyl radicals. The hexaalkyl or hexaalkenyl phosphoric acid triamides of this invention may be prepared as discussed in Methoden der Organischen Chemie, Houben Weyl, vol. 12, II, published in 1964 by Georg Thieme and Stuttgart, pp. 465 et seq.

Any suitable metal alkyl may be used to react with the initial compounds. The alkyl radicals have one to four carbon atoms, i.e. they are methyl, ethyl, propyl or butyl radicals. The metals are preferably zinc or aluminum but other Group II or III metals such as magnesium, cadmium, gallium, indium and the like may be used. In addition some of the compounds may have one alkyl radical and one or more halogen atoms as substituents so that metal alkyl halo compounds are also contemplated within the scope of the term "metal alkyl compound." The preferred compounds are diethyl zinc, dibutyl, zinc, tetraethyl aluminum, ethoxy, diethyl aluminum, diethyl chloride and the like. Other suitable compounds are magnesium diethyl, butyl magnesium bromide, methyl magnesium chloride, diethyl cadmium, diisobutyl cadmium, methyl cadmium bromide, gallium triethyl, gallium dimethyl chloride, indium tributyl and the like.

The process according to the invention may be carried out by polymerizing the alkylene oxide at normal pressure or at slightly excess pressure, at temperatures preferably of −40 to 120° C. in the presence of the catalyst which has been obtained by adding the pure or dissolved metal alkyl compound to a suspension or solution of the complex of transition metal salt and hexaalkyl or alkenyl phosphoric acid triamide, in an inert organic solvent. The molar ratio of olefine oxide; metal complex/metal alkyl compound may vary within wide limits but said molecular ratio is preferably between about 100:1:5 and 300:3:1.

Polymerization may be carried out in the presence of a solvent, or in the pure alkylene oxides themselves. Examples of suitable solvents are alkanes such as pentane, hexane or heptane, cycloalkanes such as cyclohexane or methyl cyclohexane, dialkylethers such as diethyl ether and aromatic (halogenated) hydrocarbons such as benzene, toluene, xylene or chlorobenzene.

A reaction time of between 3 and 100 hours may be required for the polymerization to proceed to a satisfactory degree. The process according to the invention thus has the advantage that polymerization reaction takes a shorter time than has hitherto been known. The crude polymer can be worked up and the catalyst inactivated by, for example, dissolving the contents of the polymerization vessel in a suitable solvent such as chloroform, toluene or benzene, and washing it successively with 3% aqueous sulphuric acid, water, sodium bicarbonate solution and, if desired, for example in the cases where heavy metal catalysts are used, with the addition of a complex forming agent such as ethylene diaminotetraacetic acid. After drying the organic solution, the solvent is evaporated off, and the polymer remains behind in pure form.

The polymers have excellent properties. When propylene oxide is used as starting material, the polymers have been found by radiographic structural analysis to have a syndiotactic or isotactic structure. The polymers are generally semi-solid, waxy or rubber-like products which can be converted into or incorporated in rubbery elastic compounds by known methods.

The polymers of the present invention are useful where such polymers have been used heretofore, for example, for reaction with organic polyisocyanates to prepare polyurethane plastics which in turn have many uses, for example, for the preparation of cast gear wheels and the like. In addition, the high molecular weight polymers of a semi-solid, waxy or rubber-like character can be used to mold various useful articles including gear wheels, seals for doors and the like.

The invention is further illustrated by the following examples in which parts are by weight unless otherwise specified.

EXAMPLE 1

About 3.3 g. of a 1:1 addition product of titanium trichloride and hexamethylphosphoric acid triamide are finely ground and suspended in about 100 ml. of toluene. About 60 ml. of the solvent are distilled off under argon for azeotropic drying. About 12 g. of dibutyl zinc are added thereto in an atmosphere of argon and the mixture is then stirred for about 30 minutes at about 70° C. About 58.1 g. of propylene oxide are then added and the mixture is stirred for a further 50 hours at about 30° C. The viscous reaction mixture is then dissolved in toluene and washed with dilute 3% sulphuric acid and then with water, sodium bicarbonate solution and water. The toluene layer is separated off, dried, filtered and evaporated in vacuo. The residue is rubbery and elastic. Yield: 19 g.

EXAMPLE 2

About 1 mol of propylene oxide is stirred under argon with about 0.01 mol of a complex of cobalt chloride and hexamethylphosphoric acid triamide and about 0.05 mol of zinc diethyl in about 25 ml. of toluene for about 30 hours at about 50° C. By the end of this time, the black reaction mixture is highly viscous. It is dissolved in about 1 liter of chloroform, treated with about 3% sulphuric acid (which causes the black color to disappear) and washed several times with water, once with sodium bicarbonate and once with 10% Trilon B solution. After removal of the solvent, an elastic product, which has the color of natural rubber remains behind. The degree of crystallization of the product has been found by X-ray to be about 6.1%. Yield: 26 g.

EXAMPLE 3

About 1 mol of propylene oxide is stirreed together with about 0.01 mol of the 1:2 adduct of nickel bromide and hexamethylphosphoric acid triamide and with about 0.05 mol of dibutyl zinc for about 30 hours at about 50° C. in at atmosphere of argon. The black, viscous mass is worked up as described in Example 2. The almost colorless, rubbery elastic polymer has a degree of crystallization of about 7.1, determined radiographically. Yield: 15 g.

EXAMPLE 4

About 2.0 mols of propylene oxide are added to a catalyst mixture of about 0.02 mol of a 1:2 complex of nickel bromide and hexamethylphosphoric acid triamide and about 0.1 mol of triethyl aluminum, and stirred for about 30 hours at about 50° C. The product is then worked up as described in Example 2. The yellowish slightly smeary polymer has a degree of crystallization determined by X-ray of about 3.3%. Yield: 27 g.

EXAMPLE 5

About 58.1 g. of propylene oxide are added to the black catalyst mixture obtained from about 4.9 g. of the 1:2 complex of cobalt chloride and hexamethylphosphoric acid triamide and about 8.9 ml. of dibutyl zinc in about 19 ml. of toluene. When the mixture has been stirred for about 30 hours at about 50° C., the polymer is dried in vacuo: crude yield 37 g. The dry crude polymer is then dissolved in about 1 liter of chloroform and is worked up as described in Example 2. About 25 g. of a pure, tough elastic product is obtained. The degree of crystallization determined by X-ray is about 6.9%.

EXAMPLE 6

About 1 mol of propylene oxide is stirred together with about 0.01 mol of a 1:2 adduct of titanium trichloride and hexamethylphosphoric acid triamide and with about 0.05 mol of dibutyl zinc in about 15 ml. of absolute toluene for about 30 hours at about 50° C. under argon. By this time, a very tough mass has formed which is dissolved in chloroform and filtered. The filtrate is concentrated by evaporation. The pale yellow, elastic residue has a radiographic degree of crystallization of about 5.9%. Yield: 32 g.

EXAMPLE 7

When about 1 mol of propylene oxide is reacted with about 0.01 mol of the titanium trichloride complex and about 0.05 mol of triisobutyl aluminum, a pale yellow, smeary polymer is obtained after about 1 hour in quantitative yield.

EXAMPLE 8

About 1 mol of propylene oxide is mixed with about 0.16 mol of allyl glycidic ether and added to a catalyst system consisting of about 0.005 mol of a 1:1 adduct of titanium trichloride and hexamethylphosphoric acid triamide and about 0.025 mol of dibutyl zinc. The mixture is then stirred for about 50 hours at about 60° C. Working up by the procedure described in Example 6 yields a yellowish copolymer of a honey-like consistency. Yield: 16 g.

EXAMPLE 9

About 0.5 mol of propylene oxide is mixed with about 0.5 mol of epichlorohydrin and added to a solution of about 0.01 mol of a 1:1 adduct of cobalt chloride and hexamethylphosphoric acid triamide. About 0.05 mol of dibutyl zinc is injected into the mixture with a syringe while it is vigorously stirred using argon as protective gas. When the reaction which is initially strongly exothermic has died down, the reaction mixture is heated to about 60° C. and then stirred at this temperature for about 30 hours. The product is then worked up by the procedure described in Example 2, yielding about 12 g. of an almost colorless, smeary copolymer.

EXAMPLE 10

About 0.01 mol of a 1:2 adduct of cobalt nitrate and hexamethylphosphoric acid triamide is dissolved in about 30 ml. of absolute toluene. A solution of about 0.05 mol of dibutyl zinc in about 25 ml. of toluene is added dropwise at a temperature down to about −70° C. The catalyst mixture is heated up to about 25° and 1 mol of propylene oxide is added. After stirring at about 50° for about 25 hours about 50 g. of crude polymerizate are obtained which produce about 37 g. of a pure rubbery and elastic polymer by working up as described in Example 2.

EXAMPLE 11

About 1 mol of propylene oxide is added to the catalyst mixture obtained from about 0.01 mol of the 1:2 complex of cobalt chloride and hexamethylphosphoric acid triamide. The reaction mixture is then brought into a sealed tube under argon. A quantitative yield of elastic polymers results in about 50° C. after about 50 hours.

EXAMPLE 12

About 1 mol of propylene oxide is added to the catalyst mixture obtained from about 0.01 mol of the 1:2 complex of nickel nitrate and hexamethylphosphoric acid triamide and about 0.05 mol of dibutyl zinc in about 130 ml. of absolute toluene. After stirring for about 1 hour at about 50° C. the reaction mixture becomes highly viscous. After further 2 hours a quantitative yield of polymers is obtained.

EXAMPLE 13

About 0.01 mol of a 1:2 adduct of cobalt nitrate and hexamethylphosphoric acid triamide is dissolved in about 50 ml. of absolute toluene and reacted with a solution of about 0.05 mol of dibutyl zinc at about −60° C. The catalyst mixture is heated to room temperature and ethylene oxide is injected from the sealed tube, thereby slowly raising the temperature to about 60° C. After three hours about 25 g. of a very tough crude polymerizate have formed which can be freed from catalyst residues by means of dialysis.

EXAMPLE 14

About 1 mol of butene-(1)-oxide is added to the catalyst mixture obtained from about 0.01 mol of the 1:2 complex of cobalt chloride and hexamethylphosphoric acid triamide and about 0.05 mols of dibutyl zinc in about 30 ml. of toluene. After stirring for about 30 hours at about 60° C. about 60 g. of a rubbery and elastic polymer are obtained by working up as described in Example 2.

EXAMPLE 15

About 1 mol of phenyl glycidic ether is added to the catalyst system obtained from about 0.01 mol of the 1:2 complex of cobalt chloride and hexamethylphosphoric acid triamide and about 0.05 mols of dibutyl zinc in about 25 ml. of absolute toluene. After about 10 hours at about 50° C. the reaction mixture becomes solid. The reaction product is a hard mass which is nearly insoluble in all organic solvents. The yield is quantitative.

EXAMPLE 16

About 0.5 mols of phenyl glycidic ether are added to the catalyst mixture obtained from about 0.005 mols of the 1:2 complex of cobalt nitrate and hexamethylphosphoric acid triamide and about 0.025 mols of aluminum triisobutyl in about 275 ml. of toluene. The reaction mixture is heated for about 1 hour at about 50° C. Then the temperature is raised to about 110° C. Already after about 2 hours the reaction mixture becomes solid. After further 10 hours at about 100 to 110° C. the jelly-like crude polymerizate is comminuted. About three times the amount of methanol is added by stirring thereby producing a fine white powder. In order to combine the catalyst residues it is several times washed with about 3% sulphuric acid, about 10% solution of the sodium salt of ethylene diamine tetraacetic acid and water. Yield: 68 g.

EXAMPLE 17

About 1 mol of styrene oxide is added to the solution of a catalyst system obtained from about 0.01 mol of the 1:2 complex of cobalt chloride and hexamethylphosphoric acid triamide and about 0.05 mols of dibutyl zinc in about 30 ml. of toluene and stirred for about 30 hours at about 50° C. About 110 g. of a very tough elastic polymer are obtained by working up as described in Example 2.

EXAMPLE 18

About 0.005 mols of the 1:2 complex of cobalt chloride and hexamethylphosphoric acid triamide are reacted with about 0.025 mols of dibutyl zinc in about 50 ml. of toluene. About 0.5 mols of cyclohexene oxide is added to the catalyst mixture and stirred for about 58 hours at about 50° C. About 30 g. of a nearly colorless tough elastic polymer are obtained by working up as described in Example 2.

EXAMPLE 19

About 1 mol of propylene oxide is added to the catalyst mixture obtained from about 0.01 mol of the 1:2 complex of zirconyl chloride and hexamethylphosphoric acid triamide and about 0.05 mols of aluminum triethyl in about 50 ml. of toluene. Already during the addition of the olefine oxide polymerization starts in strong exothermic reaction. After stirring for about 1 hour at about 25° C. the now mostly polymerized mixture is further heated for about 4 hours to about 40° C. without stirring. Yield: quantitative as a rubbery and elastic crude polymerizate.

EXAMPLE 20

(a) Production of the catalyst

About 11.3 g. of the 1:2 complex of zirconium oxy chloride and hexamethylphosphoric acid triamide are suspended in about 50 ml. of toluene and heated for about half an hour to about 100° C. after addition of about 25 ml. of aluminum triethyl. Then about 100 ml. of n-pentane are added and the formed precipitate is removed by reaction which is then dried in a high vacuum. Yield: 8.3 g. The catalyst is not self-inflammable.

(b) Process according to the invention

About 3.5 g. of the catalyst produced under (a) are suspended in about 1,350 ml. of toluene. The mixture is heated to about 70° C. At this temperature ethylene oxide is added for about 3 hours while stirring in such a manner that the gas is completely absorbed by the reaction mixture. Stirring is continued for further 2 hours at about 70° C. and the solvent is removed. The weight of the solid residue of the high molecular weight ethylene oxide amounts to about 90 g. (molecular weight 1,700,000; melting point 69° C.).

EXAMPLE 21

(a) Production of the catalyst

About 11.1 g. of the 1:2 complex of nickel nitrate and hexamethylphosphoric acid triamide are reacted together at about −40° C. in about 50 ml. of toluene with about 21.6 ml. of 50% solution of zinc diethyl in n-hexane. The reaction mixture is heated slowly to room temperature and the clear solution is decanted from the semi-solid precipitate. The precipitate is extracted with 100 ml. of pentane, removed by suction and dried in high vacuo. Yield: 11.6 g. of a black brown solid substance. The catalyst is not self-inflammable.

(b) Process according to the invention

About 1 g. of the catalyst produced under (a) is dissolved in about 20 ml. of toluene. About 8 g. of propylene oxide are added and the mixture is heated for about 15 hours at about 50° C. After extraction of the solvent about 5 g. of a rubbery and elastic polymer remain. Yield: 60%.

It is to be understood that the foregoing examples are given for the purpose of illustration and that any other suitable alkylene oxide, transition metal salt, phosphoric acid, hexaalkyl or hexaalkenyl phosphoric acid triamide, metal alkyl of the second or third group of the Periodic System or the like can be substituted in these working examples provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the polymerization of alkylene oxides which comprises polymerizing a vicinal alkylene oxide in the presence of a catalytic quantity of a catalyst obtained by reacting a complex of a transition metal salt of an organic or inorganic acid and a hexaalkyl phosphoric acid triamide or hexaalkenyl phosphoric acid triamide with a metal alkyl of a metal of the second or third group of the Periodic System said alkyl group containing from one to four carbon atoms.

2. The process of claim 1 wherein said alkylene oxide contains two to eight carbon atoms.

3. The process of claim 1 wherein said catalyst is obtained by reacting a complex of a transition metal halide and a hexaalkyl phosphoric acid triamide with a zinc or aluminum alkyl.

4. The process of claim 1 wherein said catalyst is prepared by reacting a complex of a zirconium salt and a hexaalkyl phosphoric acid triamide with a zinc or aluminum alkyl.

5. The process of claim 1 wherein said alkylene oxide is propylene oxide.

6. The process of claim 1 wherein said reaction is carried out at a temperature of from about −40 to about 120° C.

7. The process of claim 1 wherein the molar ratio of alkylene oxide: metal complex: metal alkyl compound is within the range of from about 100:1:5 to about 300:3:1.

8. The process of claim 1 wherein said transition metal salt is zirconyl chloride.

9. The process of claim 1 wherein said transition metal salt is zirconium oxy chloride.

References Cited

UNITED STATES PATENTS 3,397,155    8/1968    Naro et al.

WILLIAM H. SHORT, *Primary Examiner.*

T. CERTILLA, *Assistant Examiner.*

U.S. Cl. X.R.

260—47, 88.3, 611, 615